United States Patent
Ambroladze et al.

(10) Patent No.: US 8,327,070 B2
(45) Date of Patent: Dec. 4, 2012

(54) METHOD FOR OPTIMIZING SEQUENTIAL DATA FETCHES IN A COMPUTER SYSTEM

(75) Inventors: Ekaterina M. Ambroladze, Wappinger Falls, NY (US); Michael Fee, Cold Spring, NY (US); Arthur J. O'Neill, Jr., Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 331 days.

(21) Appl. No.: 12/822,486

(22) Filed: Jun. 24, 2010

(65) Prior Publication Data

US 2011/0320740 A1    Dec. 29, 2011

(51) Int. Cl.
*G06F 12/00*    (2006.01)
(52) U.S. Cl. .................. 711/119; 711/118; 711/165
(58) Field of Classification Search .................. 711/118, 711/119, 165
See application file for complete search history.

(56) References Cited

U.S. PATENT DOCUMENTS

| | | | | |
|---|---|---|---|---|
| 5,003,471 A | * | 3/1991 | Gibson | ............ 710/56 |
| 5,450,563 A | | 9/1995 | Gregor | |
| 5,737,575 A | | 4/1998 | Blaner | |
| 7,577,763 B1 | * | 8/2009 | Beaman | ............ 710/6 |
| 7,769,728 B2 | * | 8/2010 | Ivie | ............ 707/693 |

* cited by examiner

*Primary Examiner* — John Lane
(74) *Attorney, Agent, or Firm* — Cantor Colburn LLP; John Campbell

(57) ABSTRACT

A computer implemented method of optimizing sequential data fetches in a computer system is provided. The method includes fetching a data segment from a main memory, the data segment having a plurality of target data entries; extracting a first portion of the data segment and storing the first portion into a target data cache, the first portion having a first target data entry; and storing the data segment into an intermediate cache line buffer in communication with the target data cache to enable subsequent fetches to a number of target data entries in the data segment.

20 Claims, 5 Drawing Sheets

METHOD FOR OPTIMIZING SEQUENTIAL DATA FETCHES IN A COMPUTER SYSTEM

BACKGROUND

This invention relates generally to processing within a computing environment, and more particularly the optimization of sequential small data fetches to a larger source data segment.

Most computer systems include a main memory and a cache system to expedite access to main memory data. A typical cache system comprises a cache to store data fetched from or written to main memory, and a directory to store addresses of the data copied into the cache. A processor or requestor can access the cache faster than the main memory because the cache is typically smaller than the main memory and located closer to the processor than the main memory in a typical system hierarchy.

Storage protection keys are used in a computer system to control the access of pages in main memory that the storage protection keys are associated with. The storage protection keys are generally used to limit the areas of main memory that a program is allowed to access. The storage protection keys are usually kept in a key memory array at the same level as main memory. The key memory array can be maintained in dedicated memory arrays, custom designed memory modules that hold both keys and data or a reserved section of main memory.

The access time of storage protection keys have been improved by caching they keys along with the data in a paired cache that keeps each copy of each storage protection key associated with the data in the cache. They keys can also be cached in independent key caches not associated with a specific data cache. These types of key caches are often implemented between the highest level of data cache and the key memory array and are added to help limit the number of memory accesses for keys.

There is a development saving to utilizing the same memory modules for main memory and key memory arrays, however, the amount of data that is returned from the main memory is designed and optimized for system main memory data fetch and store applications instead of for storage protection keys. The storage protection key associated with the page of the target data is usually smaller than a system memory fetch. Thus, in order to limit the amount of fetches and stores to key memory, a key cache can be implemented to reduce the number of key memory requests and serve keys to the requester faster. However, data is still thrown away with a key cache design if the keys that are cached are smaller than the memory access size. So when a request misses in the key cache, a data segment of key protection keys is fetched from main memory. A portion of the data segment for the key cache is peeled off and stored in the key cache while the rest of the data is thrown away.

Throwing away all this data can be inefficient, especially if the requestor is fetching to many sequential pages (i.e., key ops mapping to a large portion of the main memory that includes many sequential pages) since the next fetch miss data may have been sitting in the data that was thrown away.

BRIEF SUMMARY

An embodiment is a computer implemented method of optimizing sequential data fetches in a computer system. The method comprises fetching a data segment from a main memory, the data segment having a plurality of target data entries; extracting a first portion of the data segment and storing the first portion into a target data cache, the first portion having a first target data entry; and storing the data segment into an intermediate cache line buffer in communication with the target data cache to enable subsequent fetches to a number of target data entries in the data segment.

Another exemplary is a system for optimizing sequential data fetches in a computer system. The system includes a computer memory; and one or more processors in communication with the computer memory, the one or more processors configured to perform a method comprising: fetching a data segment from a main memory, the data segment having a plurality of target data entries; extracting a first portion of the data segment and storing the first portion into a target data cache, the first portion having a first target data entry; and storing the data segment into an intermediate cache line buffer in communication with the target data cache to enable subsequent fetches to a number of target data entries in the data segment.

A further exemplary embodiment is a computer program product for optimizing sequential data fetches in a computer system. The system includes a tangible storage medium readable by a processing circuit and storing instructions for execution by the processing circuit for performing a method comprising: fetching a data segment from a main memory, the data segment having a plurality of target data entries; extracting a first portion of the data segment and storing the first portion into a target data cache, the first portion having a first target data entry; and storing the data segment into an intermediate cache line buffer in communication with the target data cache to enable subsequent fetches to a number of target data entries in the data segment.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

Exemplary embodiments of the present invention provide systems and methods for optimizing sequential small data fetches to a larger source data segment in a multi-processor computing system. In an exemplary embodiment, the computing system supports the optimization of sequential small data fetches to a larger source data segment by storing a complete data segment (e.g., 256 byte line) of target data entries (e.g., storage protection keys) from main memory that was last fetched from a target data storage area (e.g., key storage area) of main memory for a target data entry fetch 'miss' in a buffer. Therefore, if a subsequent target data entry fetch 'miss' occurs to the same data segment, the buffer is referenced for the target data entry rather than the target data storage area of main memory. These exemplary embodiments save the round trip of going to main memory multiple times for sequential fetches to a large number of pages.

Figure 1:
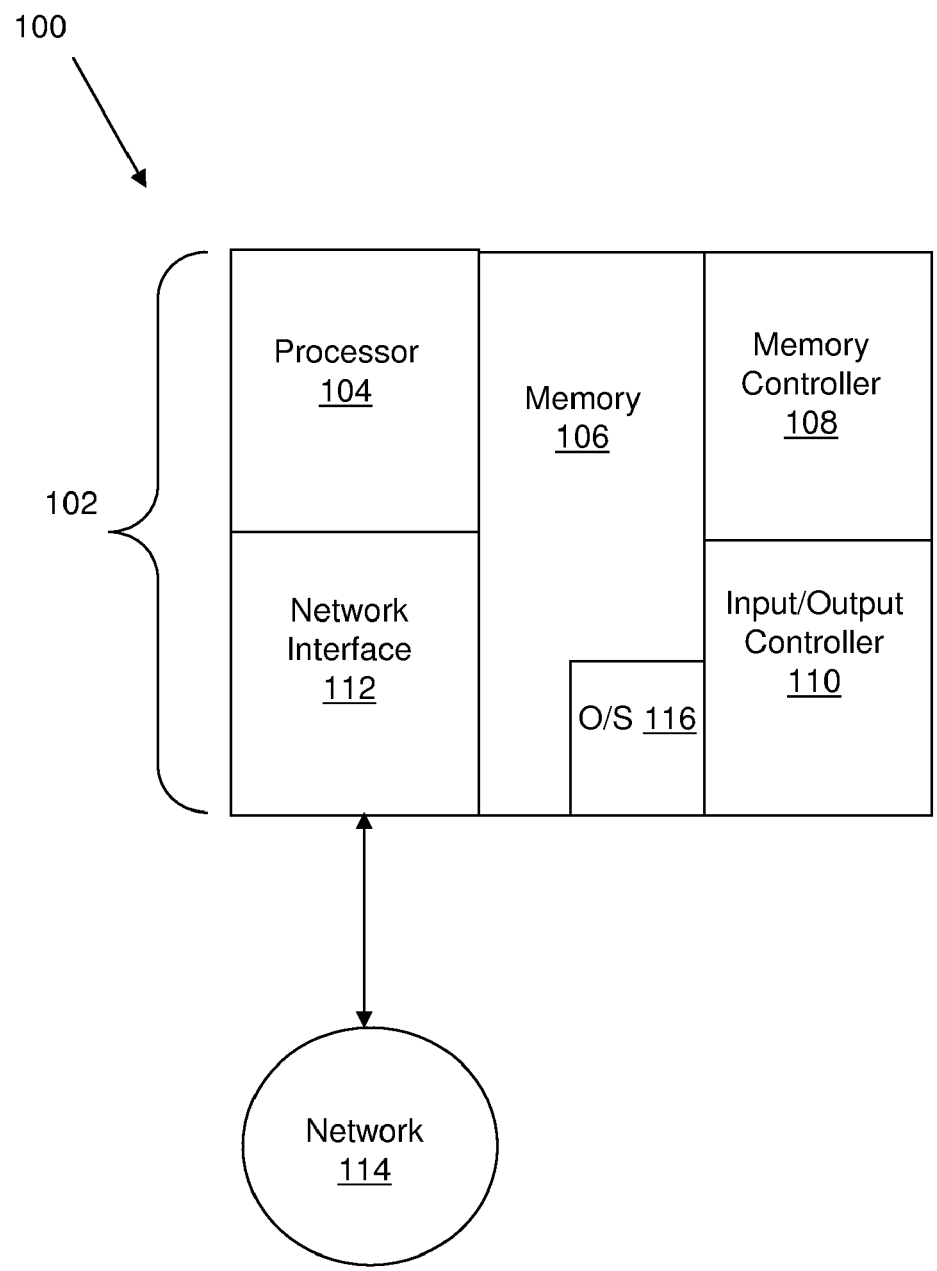
FIG. 1 depicts a block diagram illustrating a computing system that may be implemented by an exemplary embodiment.

Turning now to FIG. 1, a block diagram illustrates a computing system 100 having capabilities, which may be included in exemplary embodiments of the present invention. The computing system 100 includes a computing device 102 according to an exemplary embodiment. The computing device 102 can be any computing platform or processing system having capabilities as illustrated, and may utilize packetized communications for internal communications between elements. Various methods, procedures, modules, flow diagrams and techniques discussed herein may also incorporate and/or utilize the capabilities of the computing device 102. As can be appreciated, the computing device 102 can be any computing device, including but not limited to, a server, a desktop computer, a laptop, a portable hand-held device, or any other electronic device.

The computing device 102 generally includes one or more processors, generally depicted as processor 104; a memory device, generally depicted as memory 106, a memory controller 108, and input/output controller 110. In an exemplary embodiment, the computing device 102 can include a network interface 112 for coupling to a network 114. The network 114 is configured to connect computing device 102 with other devices (e.g., other computing devices, storage devices, peripheral devices, etc.), and may include one or more wide area networks (WANS) and/or local area networks (LANS) such as, for example, the Internet, intranet(s), and/or wireless communication network(s).

In an exemplary embodiment, the memory 106 stores instructions that can be executed by processor 104. The instructions stored in memory 106 may include one or more separate programs, each of which comprises an ordered listing of executable instructions for implementing logical functions. In the example of FIG. 1, the instructions stored in the memory 106 include a suitable operating (OS) 116. The operating system 116 essentially controls the execution of other computing programs and provides scheduling, input-output control, file and data management, memory management, and communication control and related services.

When the computing device 102 is in operation, the processor 104 is configured to execute the instructions stored within the memory 106, to communicate data to and from the memory 106, and to generally control operations of the computing system 100 pursuant to the instructions. The processor 104 described herein can be any custom made or commercially available processor, a central processing unit (CPU), an auxiliary processor among several processors associated with the computer system, a semiconductor based micro-processor (the form of a microchip or chip set), a macro-processor, or generally any device for executing instructions. In an exemplary embodiment, each processor comprises a combination of hardware and/or software/firmware with a computer program that, when loaded and executed, permits the processor to operate such that it carries out the methods described herein. One or more processors execute the systems and methods for optimizing sequential small data fetches to a large data segment as described herein. In various embodiments, the processor 104 includes memory or cache systems and methods as described herein. The computing device 102 and methods described herein can be directed to peeling off any type of target data entry from a larger data segment of any type. However, for ease of discussion, the computing device 102 and methods described herein will be discussed in the context of peeling of target storage protection keys from a larger data segment of keys.

Figure 2:
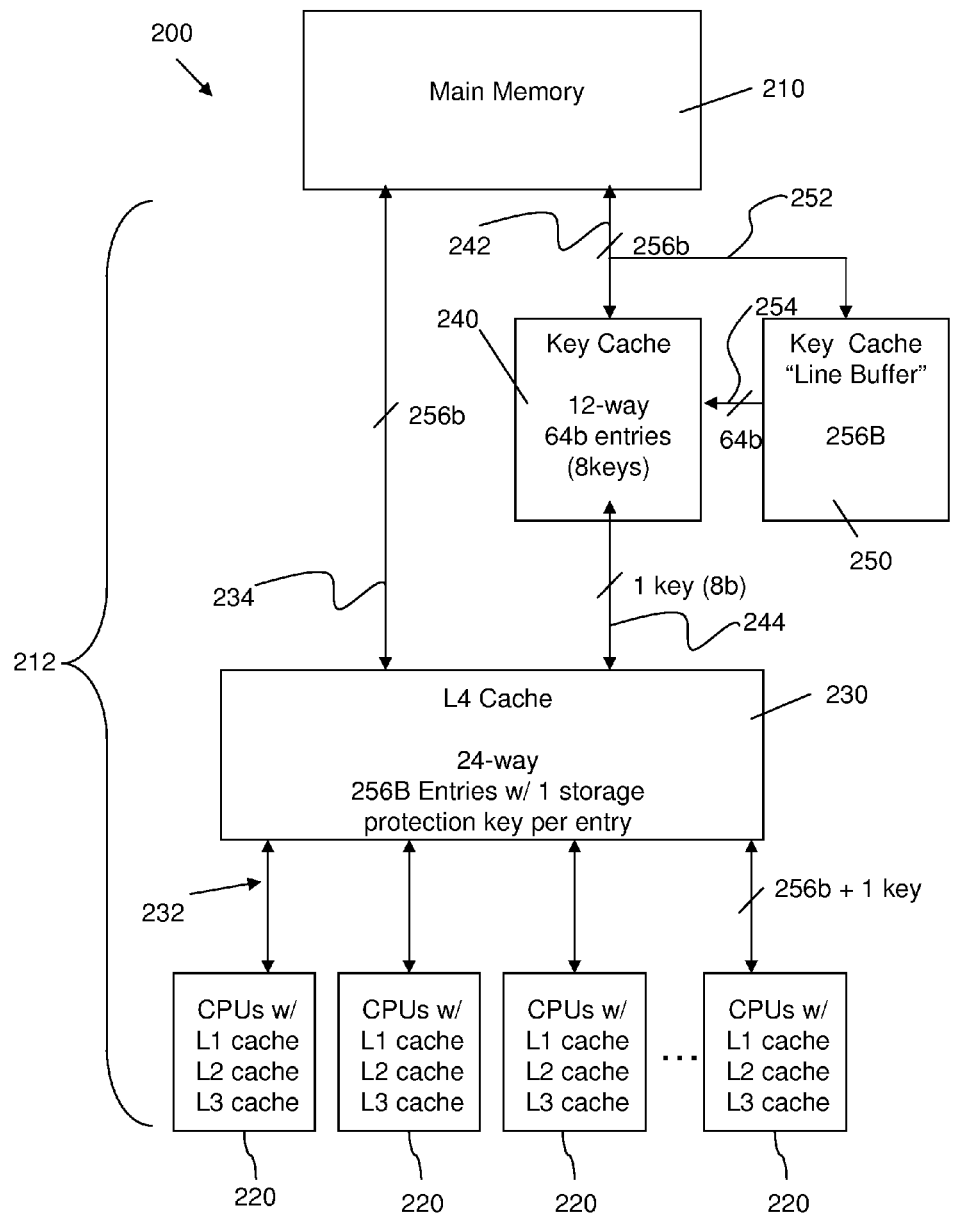
FIG. 2 depicts a block diagram of a storage hierarchy of a computing system that may be implemented by an exemplary embodiment.

Turning now to FIG. 2, a block diagram illustrating an exemplary hierarchal data cache system 200 of one or more elements of the computing device 102 according to an exemplary embodiment is provided. The hierarchal data cache system 200 generally includes a main memory 210 and lower level data caches 212. Main memory 210 includes pages of data (e.g., 4,096 byte (B) pages) and storage protection keys, which may be in separate sections of main memory 210. As such, when data is fetched from main memory 210, also furnished are storage protection keys (e.g., 8-bit keys) each associated with a chunk of data of any size depending on the system architecture. However, fetches of storage protection keys from main memory 210 are time consuming since access time increases as you move up the hierarchy. As used herein, the 'storage protection keys' may also referred to as 'target data entries'.

The memory hierarchy 200 as described herein generally transfers data segments (e.g., 256 byte lines) between memory elements according to an exemplary embodiment. For example, storage protection keys are packaged together to form 256 byte lines of consecutive keys, which are accessed from main memory 210. Of course, the size of data transfer can vary depending on the system architecture. For example, blocks of data in 1-gigabyte may be transferred between elements. For ease of discussion, exemplary embodiments are generally discussed in the context of transferring data in a 256 byte basis.

In this exemplary hierarchal cache system 200 of computing device 102, one or more central processing units (CPU) 220 for performing reading and executing of instructions are provided. Each CPU 220 may include multiple cache levels, such as, for example, L1 cache, L2 cache, and L3 cache that may be on-chip or off-chip from the CPU 220. In other words, each CPU may have its own levels of caches, making up portions of the lower level caches 212 of hierarchal cache system 200. Each cache level within each CPU 220 may be owned by that CPU or shared between other CPUs. For example, L3 cache may be shared between all four CPUs. The number of CPUs and number of cache levels within each CPU can vary depending on the application and should not be limited to the system configuration shown herein.

In an exemplary embodiment, the hierarchal cache system 200 further includes another cache level, generally depicted as L4 cache 230. Each CPU 220 operatively communicates to L4 cache 230 via buses 232. The L4 cache 230 includes data entries (e.g., 256B line data entries) with each line's associated storage protection key. Of course, the size of each data entry can vary and should not be limited to the example described herein. The L4 cache 230 operatively communicates to main memory 210 via bus 234. For ease of discussion, FIG. 2 illustrates a single CPU 220 operatively coupled to a single L4 cache 230 but applies to multiple CPUs 220 and L4 caches 230. In an exemplary embodiment, each cache of the L1 caches, L2 caches, L3 caches and L4 caches has its own respective control logic or shared control logic that controls cache operations/functions as well as address translation. The control logic as described herein for each cache or memory may include one or more components (e.g., a controller, associated directory, etc.) for performing functions and methods as described herein.

In accordance with an exemplary embodiment, each individual CPU 220 is fabricated on its own separate chip, which includes L1, L2, and L3 caches and the L4 cache 230 is fabricated on its own separate chip. The caches/buffers described herein may be fabricated on their own separate chip or implemented on the same chip of one or more caches/buffers. As can be appreciated by a skilled artisan, fabrication of chips including integrated circuits, wires, metal layers, semiconductor (and/or other material) components, etc., may be formed via lithography and other known or later developed techniques.

In an exemplary embodiment, system 200 further includes a key cache 240 configured to store storage protection keys each associated with a chunk of data. As used herein, the 'key cache' may also be referred to as the 'target data cache'. The key cache 240 is configured to store data entries (e.g., 64-bit line key entries) of storage protection keys. Of course, the size of each key data entry can vary and should not be limited to the example described herein. In an exemplary embodiment, the key cache 240 is implemented on the memory controller 108 to serve storage protection keys to the requestor at a faster rate. The key cache 240 operatively communicates to main memory 210 and the L4 cache via bus 242 and bus 244 respectively. In an exemplary embodiment, the key cache 240 stores entries of storage protection keys fetched from main memory 210 while L4 cache 230 stores line entries of data (e.g., regular data) with a storage protection key per entry. As such, the L4 cache 230 and the key cache 240 operatively store data in parallel.

Storing storage protection keys in the key cache 240 limits the number of wasteful transfers from main memory 210 and enables for the return of storage protection keys to the requestor in a faster rate. Thus, when data is fetched main memory 210 in response to a fetch miss condition, main memory 210 transfers a data segment of target data (e.g., 256B data segment of regular data) into L4 cache 230 via bus 234, and transfers a data segment of storage protection keys (e.g., 256B data segment of keys) to key cache 240, which operatively transfers storage protection keys into the L4 cache 230 via bus 244. However, only a portion of the complete data segment being transferred from the main memory 210 to the key cache 240 is stored in the key cache 240. The reason for this is due to the size of each key line entry (e.g., 64-bit line), which is smaller than the size of the data segment (256B line). In this example, the key cache 240 stores only 64 bits of the 256B data segment being transferred from the main memory 210. In an exemplary embodiment, the key cache 240 has its own respective control logic that controls cache operations/functions as well as handles address conflicts. Alternatively, the key cache 240 shares the same control logic as main memory 210 or other caches described herein according to an exemplary embodiment.

Main memory fetches occur when a fetch miss condition occurs in the lower level caches. For example, if a CPU 220 sends out a request with an address of the target data, each directory of the lower level caches are checked to see whether the address that corresponds to that data (e.g., 256B data) is in the caches. In this example, caches L1, L2, and L3 are checked in order first. If the address of the target data is not there, which is considered a 'miss', the directory of the L4 cache 230 is checked next. If the address is also not in the L4 cache 230, a main memory fetch is performed as described above. However, if the address is found in either of these lower level caches, the data is fetched and returned to the requesting CPU 220 as well as the storage protection key corresponding to the target data.

In an exemplary embodiment, the system 200 further includes a key cache line buffer 250 configured to store the complete data segment of storage protection keys fetched from the main memory 210. As used herein, the 'key cache line buffer' may also be referred to as the 'intermediate cache line buffer'. The key cache line buffer 250 may be in a section of the key cache 240 according to an exemplary embodiment. The key cache line buffer 250 may share the same control logic as the key cache 240 or have its own respective control logic that controls cache operations/functions as well as handles address conflicts. The key cache line buffer 250 generally serves as an intermediate storage between the main memory 210 and the key cache 240. The key cache line buffer 250 operatively communicates between the main memory 210 and the key cache 240 via bus 252 and bus 254 respectively according to an exemplary embodiment. As such, when a key fetch miss condition (address of target storage protection key does not match any address in key cache) occurs in the key cache 240, the target storage protection key is attempted to be referenced in the key cache line buffer 250 rather than in main memory 210. If the storage protect key exists in the key cache line buffer 250 this reduces access time.

In an exemplary embodiment, an address compare register containing the address of the data segment in the key cache line buffer 250 is set and stored therein. This address is used to check whether the target storage protection key is in the key cache line buffer 250 and includes a 'valid for compare' bit that is selectively set to indicate whether the key cache line buffer is valid. In other words, the 'valid for compare' bit is indicative of whether target data should be checked for in the key cache line buffer 250. This register is managed through control logic according to an exemplary embodiment.

Upon a fetch request to the key cache line buffer 250, if the 'valid for compare' bit is turned on the address of the target storage protection key is compared to the address compare register. Either a miss or a hit may result from the comparison. If a miss occurs or the 'valid for compare' bit is turned off in the key cache line buffer 250, a main memory fetch is performed and a new data segment (e.g., new 256B line) from main memory 210 is stored in the line buffer 250 on top of the previously stored data segment according to an exemplary embodiment. Alternatively, the new data segment may be stored in another key cache line buffer (not shown) and be referenced there. If a hit occurs in the key cache line buffer 250, a portion (e.g., 64-bit key entry) of the data segment in the line buffer 250 is fetched and stored in the key cache 240 via bus 254. A subsequent fetch to the data segment may be performed when another key fetch miss condition occurs and the requestor is making sequential fetches. In other words, the key cache line buffer 250 is valuable for sequential fetches and the same data segment is being accessed. In an exemplary embodiment, a portion of the data segment transferring from main memory 210 to the key cache 240 may be peeled off the data segment and stored in the key cache 240 in parallel with storing the entire data segment in the key cache line buffer 250.

In accordance with an exemplary embodiment, data may be modified or cast out from key cache 240 and/or other lower level caches. According to an exemplary embodiment, changes to data stored in the key cache 240 or other lower level caches are stored back into main memory 210. Addresses are updated in response to these changes according to an exemplary embodiment. In an exemplary embodiment, the 'valid for compare' bit is turned off in response to changes to data in the other caches (e.g., key cache 240). Thus, upon a key fetch miss condition, data is fetched from main memory 210 rather than from the key cache line buffer 250, which is subsequently stored with the newly fetched data. In an exemplary embodiment, the address register of the key cache line buffer 250 is updated for the newly stored address in the buffer 250.

Figure 3:
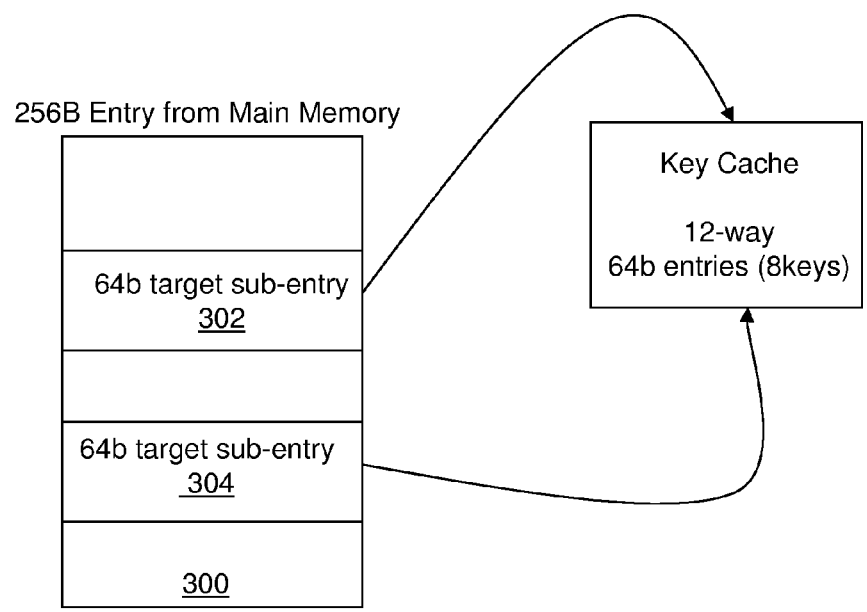
FIG. 3 depicts a schematic illustrating an exemplary key cache fetch operation performed by the computing system that may be implemented by an exemplary embodiment.

FIG. 3 illustrates an exemplary data segment 300 from main memory stored in the key cache line buffer 250. The data segment 300 includes multiple line entries, such as line entry 302 and 304. The data segment 300 stored in the line buffer 250 allows subsequent key fetch misses to fetch from the line buffer 250 rather than main memory 210. For example, the line entry 302 is fetched and stored in key cache 240 when a first key fetch miss occurs and line entry 304 is subsequently fetched when a second key fetch miss occurs and the fetches are made to the same data segment 300. As such, the key cache line buffer 250 is useful when subsequent fetches are to the same data segment for other storage protection keys.

In an exemplary embodiment, entries are cast out of the key cache 240 and/or the key cache line buffer 250 when new entries are stored in the caches. Entries are casted out by control logic associated with the key cache 240 and/or the key cache line buffer 250 according to an exemplary embodiment. In an exemplary embodiment, any time new data is stored in either caches, the directory for each respective cache is updated.

Figure 4:
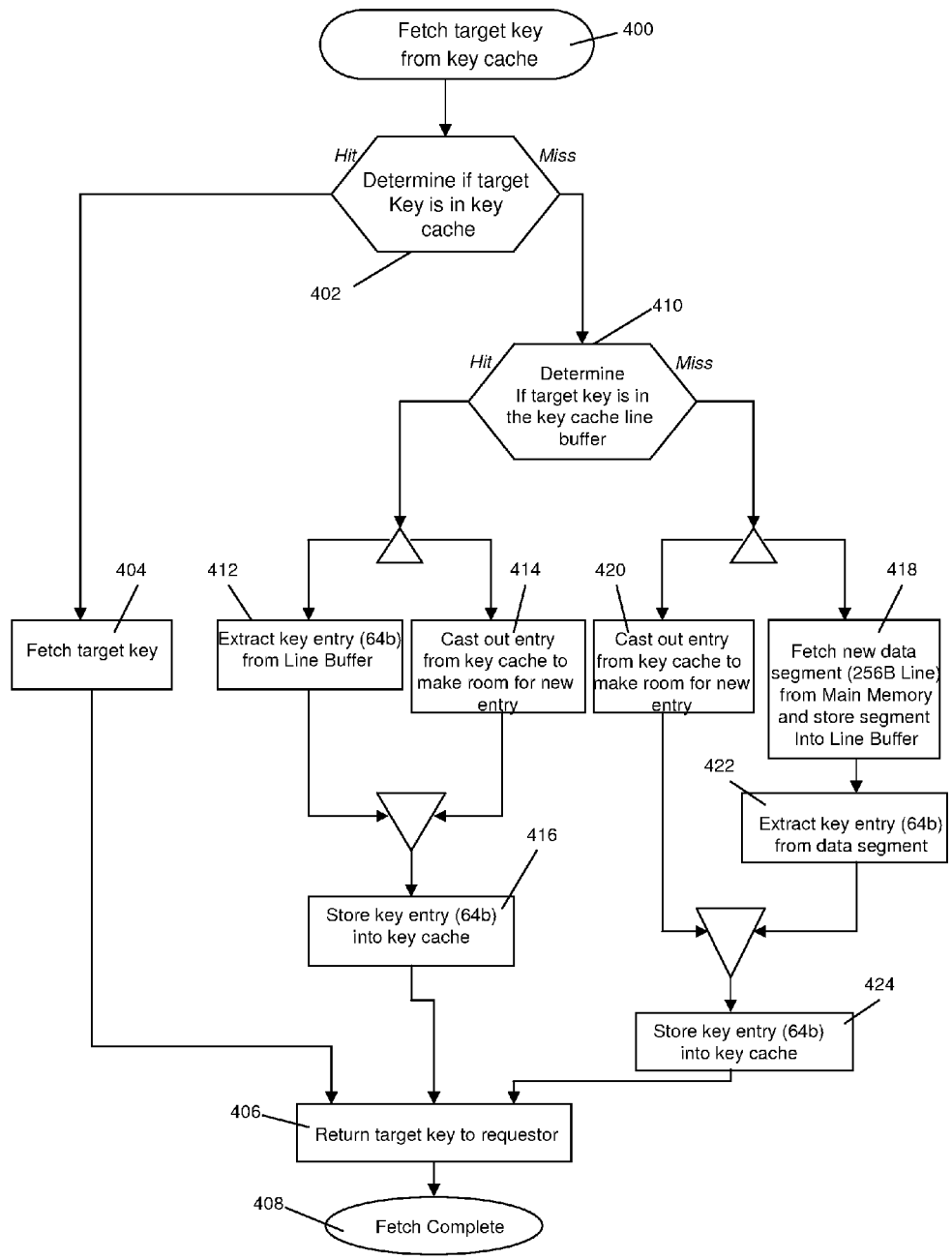
FIG. 4 depicts a flow diagram illustrating a method for optimizing sequential small data fetches to a larger source data segment that may be implemented by an exemplary embodiment.

FIG. 4 illustrates a process flow diagram illustrating a method for optimizing sequential small data fetches to a larger source data segment according to an exemplary embodiment. At block 400, fetch target key from key cache 240. In this example, a storage protection key (target key) is fetched from key cache 240 when the address of the target storage protection key is not matched in the other lower level caches (e.g., L1, L2, L3 and L4). At block 402, determine whether the target key is in the key cache 240. If a hit occurs at block 402, fetch target key at block 404. Then, return target key to requestor at block 406. Complete fetch at block 408. However, if a miss occurs at block 402, determine if target key is in key cache line buffer 250 at block 410. The key cache line buffer 250 is referenced for the target key upon a key cache miss rather than main memory 210 according to an exemplary embodiment. In accordance with an exemplary embodiment, a comparison of the address of the target key to the address in the address compare register is performed to determine if the target key is in the key cache line buffer 250. If a hit occurs at block 410, extract key entry from the key cache line buffer 250 at block 412 and cast out entry from key cache 240 to make room for new entry at block 414. In this example, the key entry (target key) is a 64$b$ entry, which is a portion of the data segment in the key cache line buffer 250. Next, store key entry into key cache 240 at block 416. Then return target key to requestor and complete fetch at blocks 406 and 408 respectively. If a miss occurs at block 410, fetch new data segment (256B line) from main memory 210 and store segment into key cache line buffer 250 at block 418 and cast out entry from key cache 240 to make room for new entry at block 420. The newly fetched data segment includes another line of consecutive keys. Next, extract key entry from the data segment at block 422. In this example, the key entry (target key) is a 64$b$ entry, which is a portion of the data segment fetched from main memory 210. At block 424, store key entry into key cache 240. Then return target key to requestor and complete fetch at blocks 406 and 408 respectively. The blocks described above can be executed by control logic of one or more caches, memory, or processors.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention, and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
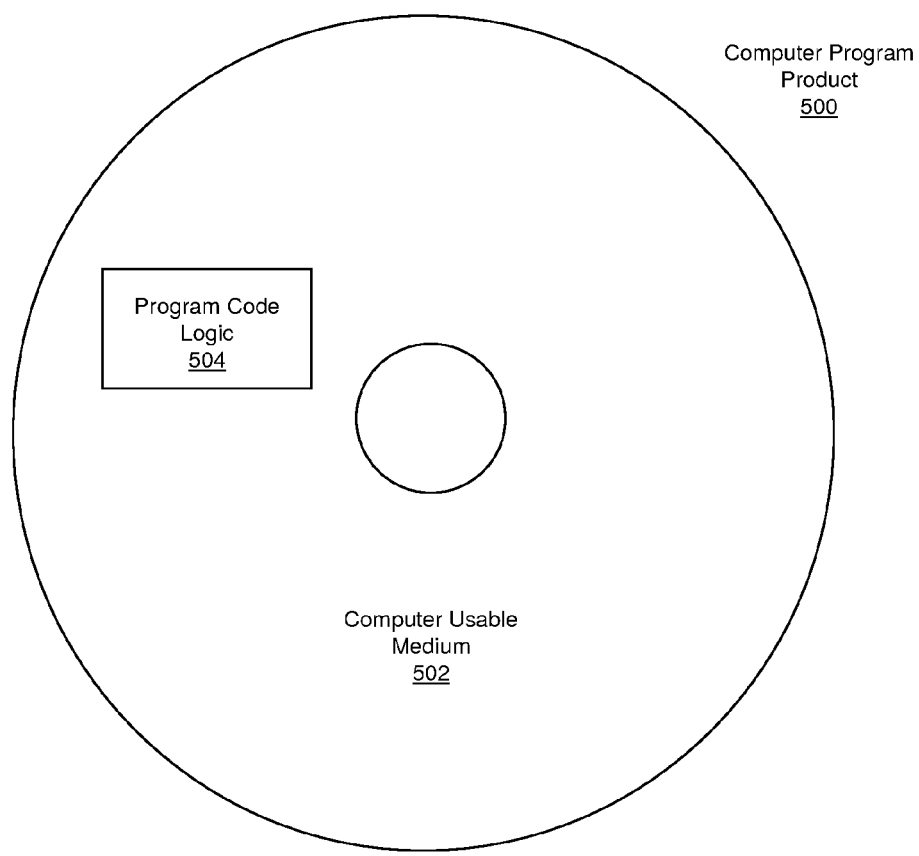
FIG. 5 depicts a computer program product that may be implemented by an exemplary embodiment of the invention.

As described above, embodiments can be embodied in the form of computer-implemented processes and apparatuses for practicing those processes. In exemplary embodiments, the invention is embodied in computer program code executed by one or more network elements. Embodiments include a computer program product 500 as depicted in FIG. 5 on a computer usable medium 502 with computer program code logic 504 containing instructions embodied in tangible media as an article of manufacture. Exemplary articles of manufacture for computer usable medium 502 may include floppy diskettes, CD-ROMs, hard drives, universal serial bus (USB) flash drives, or any other computer-readable storage medium, wherein, when the computer program code logic 504 is loaded into and executed by a computer, the computer becomes an apparatus for practicing the invention. Embodiments include computer program code logic 504, for example, whether stored in a storage medium, loaded into and/or executed by a computer, or transmitted over some transmission medium, such as over electrical wiring or cabling, through fiber optics, or via electromagnetic radiation, wherein, when the computer program code logic 504 is loaded into and executed by a computer, the computer becomes an apparatus for practicing the invention. When implemented on a general-purpose microprocessor, the computer program code logic 504 segments configure the microprocessor to create specific logic circuits.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention claimed is:

1. A computer implemented method of optimizing sequential data fetches in a computer system, the method comprising:

fetching a data segment from a main memory, the data segment having a plurality of target data entries;

extracting a first portion of the data segment and storing the first portion into a target data cache, the first portion having a first target data entry; and storing the data segment into an intermediate cache line buffer in communication with the target data cache to enable subsequent fetches to a number of target data entries in the data segment.

2. The method of claim 1, further comprising referencing the intermediate cache line buffer rather than the main memory upon a target data entry fetch miss condition at the target data cache.

3. The method of claim 1, further comprising maintaining an address compare register containing an address of the data segment in the intermediate cache line buffer.

4. The method of claim 3, wherein the address compare register includes a bit selectively set to indicate whether the data segment stored in the intermediate cache line buffer is valid.

5. The method of claim 4, further comprising referencing the intermediate cache line buffer for a second target data entry upon a target data entry fetch miss condition and comparing an address of the second target data entry to the address in the address compare register.

6. The method of claim 5, further comprising extracting a second portion of the data segment from the intermediate cache line buffer and storing the second portion of the data segment in the target data cache upon the comparison resulting in matched addresses, the second portion of the data segment having the second target data entry.

7. The method of claim 6, further comprising fetching a new data segment from the main memory upon an intermediate cache line buffer miss condition and storing the new data segment in the intermediate cache line buffer, the intermediate cache line buffer miss condition corresponding to the comparison resulting in unmatched addresses.

8. The method of claim 1, wherein the intermediate cache line buffer is an intermediate cache between the main memory and the target data cache, and wherein the plurality of target data entries comprises storage protection keys each associated with a chunk of data.

9. A system for optimizing sequential data fetches in a computer system, the system comprising:
   a computer memory; and
   one or more processors in communication with the computer memory, the one or more processors configured to perform a method comprising:
      fetching a data segment from a main memory, the data segment having a plurality of target data entries;
      extracting a first portion of the data segment and storing the first portion into a target data cache, the first portion having a first target data entry; and
      storing the data segment into an intermediate cache line buffer in communication with the target data cache to enable subsequent fetches to a number of target data entries in the data segment.

10. The system of claim 9, wherein the method further comprises referencing the intermediate cache line buffer rather than the main memory upon a target data entry fetch miss condition at the target data cache.

11. The system of claim 9, wherein the method further comprises maintaining an address compare register containing an address of the data segment in the intermediate cache line buffer.

12. The system of claim 11, wherein the address compare register includes a bit selectively set to indicate whether the data segment stored in the intermediate cache line buffer is valid.

13. The system of claim 12 wherein the method further comprises referencing the intermediate cache line buffer for a second target data entry upon a target data entry fetch miss condition and comparing an address of the second target data entry to the address in the address compare register.

14. The system of claim 13, wherein the method further comprises extracting a second portion of the data segment from the intermediate cache line buffer and storing the second portion of the data segment in the target data cache upon the comparison resulting in matched addresses, the second portion of the data segment having the second target data entry.

15. The system of claim 14, further comprising fetching a new data segment from the main memory upon an intermediate cache line buffer miss condition and storing the new data segment in the intermediate cache line buffer, the intermediate cache line buffer miss condition corresponding to the comparison resulting in unmatched addresses.

16. The system of claim 9, wherein the plurality of target data entries comprises storage protection keys each associated with a chunk of data.

17. A computer program product for optimizing sequential data fetches in a computer system, comprising:
   a tangible storage medium readable by a processing circuit and storing instructions for execution by the processing circuit for performing a method comprising:
      fetching a data segment from a main memory, the data segment having a plurality of target data entries;
      extracting a first portion of the data segment and storing the first portion into a target data cache, the first portion having a first target data entry; and
      storing the data segment into an intermediate cache line buffer in communication with the target data cache to enable subsequent fetches to a number of target data entries in the data segment.

18. The computer program product of claim 17, wherein the method further comprises referencing the intermediate cache line buffer rather than the main memory upon a target data entry fetch miss condition at the target data cache.

19. The computer program product of claim 17, wherein the method further comprises maintaining an address compare register containing an address of the data segment in the intermediate cache line buffer, the address compare register includes a bit selectively set to indicate whether the data segment stored in the intermediate cache line buffer is valid.

20. The computer program product of claim 17, wherein the plurality of target data entries comprises storage protection keys each associated with a chunk of data.

* * * * *